United States Patent [19]

Dob et al.

[11] Patent Number: 4,734,012

[45] Date of Patent: Mar. 29, 1988

[54] BLOWER SPEED CONTROL

[75] Inventors: Allan M. Dob, Clifton; John W. Wurst, Far Hills, both of N.J.

[73] Assignee: SSMC Inc., Shelton, Conn.

[21] Appl. No.: 39,404

[22] Filed: Apr. 17, 1987

[51] Int. Cl.⁴ .............................................. F04B 49/10
[52] U.S. Cl. ........................................ 417/32; 236/49; 307/632; 318/334
[58] Field of Search ............ 236/49 D; 62/186, 228.4; 417/44, 45, 32; 307/632; 318/345 H, 334

[56] References Cited

U.S. PATENT DOCUMENTS

| | | |
|---|---|---|
| 2,200,119 | 7/1940 | Persons ................................. 98/31.6 |
| 4,078,393 | 3/1978 | Wills ..................................... 62/184 |
| 4,394,957 | 7/1983 | Newton, III .......................... 236/49 |
| 4,611,756 | 9/1986 | Ohashi ................................. 236/49 |
| 4,659,290 | 4/1987 | Kundert ............................... 318/334 |

Primary Examiner—William E. Wayner
Attorney, Agent, or Firm—Robert E. Smith

[57] ABSTRACT

A speed controlling circuit for an alternating current powered blower motor is disclosed in which rectified direct current voltages are manipulated, regulated responsive to ambient temperature, and compared so as to provide reliable and cost effective blower speed control in proportion to ambient temperature and low blower speed cut off.

5 Claims, 6 Drawing Figures

BLOWER SPEED CONTROL

BACKGROUND OF THE INVENTION

1. Field of the Invention

This invention relates to electric motor driven fans and blowers, and more particularly, to a novel, advantageous, and highly cost effective arrangement for controlling the influence of a fan or blower by automatically varying the speed of operation in a predetermined proportion to changes in temperature of the medium being impelled by the fan or blower.

2. State of the Prior Art

Numerous patents exist, such as the Persons U.S. Pat. No. 2,206,119, disclosing use of a thermostatically controlled relay to initiate or terminate blower operation at a predetermined temperature. The mechanical nature of operation of these devices is not only costly to manufacture and subject to wear in use, but they only provide for on or off control of the blower and not for blower speed variation so that they fail to take advantage of the variation in cooling effect attained by variation in blower speed proportionate to air temperature.

The Ohashi U.S. Pat. No. 4,611,756 is representative of the disclosure of a temperature responsive resistor in a fan motor circuit to protect the motor from overheating should rotation of the fan blades be blocked.

The Newton U.S. Pat. No. 4,394,957 discloses blower motor control circuitry by which blower speed may be varied in response to temperature changes. The control circuitry disclosed therein, however, is unduly complicated and costly; it involves the use of parallel sets of multivibrators and flip-flops for generating and comparing pulse widths. The complicity and expense make it impractical for use in a low cost appliance such as a table fan.

SUMMARY OF THE INVENTION

It is an object of this invention to provide a simple and cost effective means for controlling the output of an electric motor driven fan or blower by the operation of contact free electronic components in the electric circuit supplying power to the fan or blower motor, which components vary the motor speed in a predetermined proportion to the temperature of the medium being impelled by the fan or blower.

It is also an object of this invention to provide a novel arrangement of elements in the electric circuit of the above described character to protect the electric motor by turning off the current should the fan speed be lowered below a predetermined minimum value.

Although this invention finds utility in ceiling fans, window fans, air conditioning units, automotive and building ventilation systems and the like, the cost effectiveness and rugged durability of the speed controlling arrangement of this invention make this invention particularly advantageous in application to table fans. In this regard it is a further object of this invention to provide a novel and advantageous arrangement of electric circuit elements of this invention with respect to table fan parts to ensure fan speed control accurately in response to temperature variation of the air being moved by the fan without influence of heat generated by operation of the fan motor or elements in the fan control circuitry.

DESCRIPTION OF THE DRAWINGS

With the above and additional objects and advantages in view as will hereinafter appear, this invention will now be described with references to a preferred embodiment illustrated in the accompanying drawings in which:

In FIG. 1 a table fan is indicated generally at 11 and includes a supporting base 12 from which rises a standard 13 terminating at its upper extremity in a clevis 14 in which a motor support 15 may be clamped in selected position about axis X—X by a thumb screw 16. A motor housing 17 is pivotally supported either for oscillation or for selective positioning about axis Y—Y in the motor support 15. Fan blades 18 are secured to and driven by the shaft (not shown) of an electric motor 19 in the motor housing 17 and the fan blades are encompassed by a grille 20 carried on the motor housing 17.

As shown in FIG. 2, the supporting base 12 and standard 13 are hollow and may be closed at the bottom by a panel 21 formed with air vent holes 22. Between the standard 13 and the motor support 15 there exists substantial clearance 23 not only to provide for unimpeded adjustment of the motor support 15 about axis X—X and for passage of electric wires 24 supplying current to the motor 19, but also to provide for air flow upwardly through the standard 13 when negative pressure develops at the top of the standard during rotation of the fan blades 18.

Figure 1:
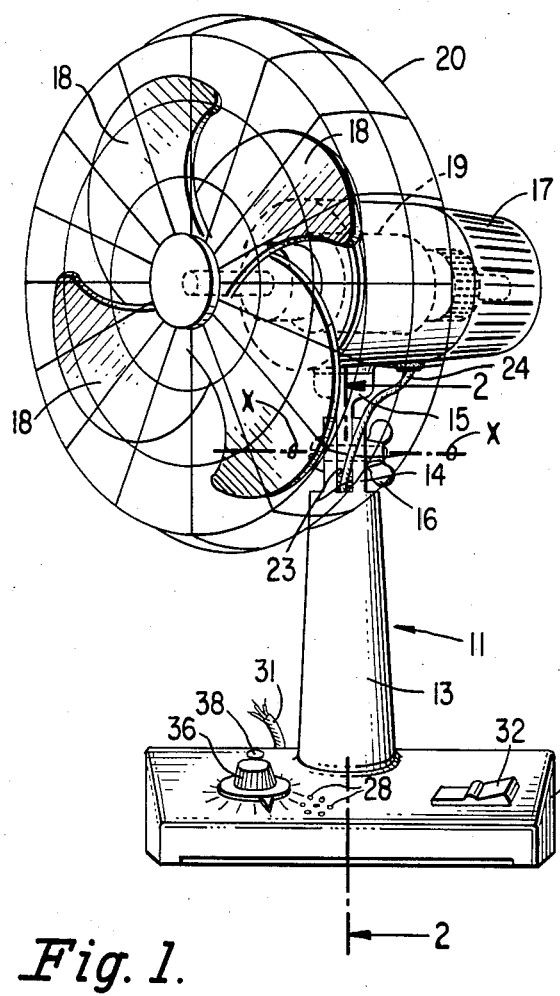
FIG. 1 is a front elevational view of a table fan to which this invention has been applied.
Figure 2:
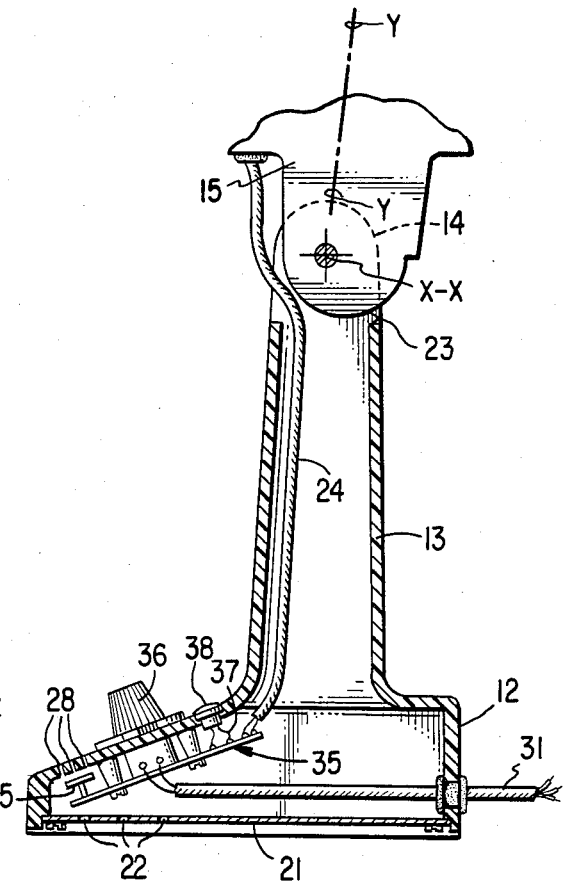
FIG. 2 is a cross sectional view of the base of the table fan taken substantially along line 2—2 of FIG. 1.

Also as shown in FIGS. 1 and 2 and electric cord 31 supplying power to the table fan is accommodated through the rear of the supporting base and is connected to a three position rocker switch 32 on the supporting base and a circuit board 35 within the supporting base on which a manually adjustable fan speed control which can be set by a knob 36 is mounted. The electric cord 31, as well as wires 37 to a signal lamp 38 visible through the standard 13 are directed from the circuit board 35. The details of the circuit board and of the elements carried thereon will now be described with particular reference to the circuit diagram of FIG. 3.

Figure 3:
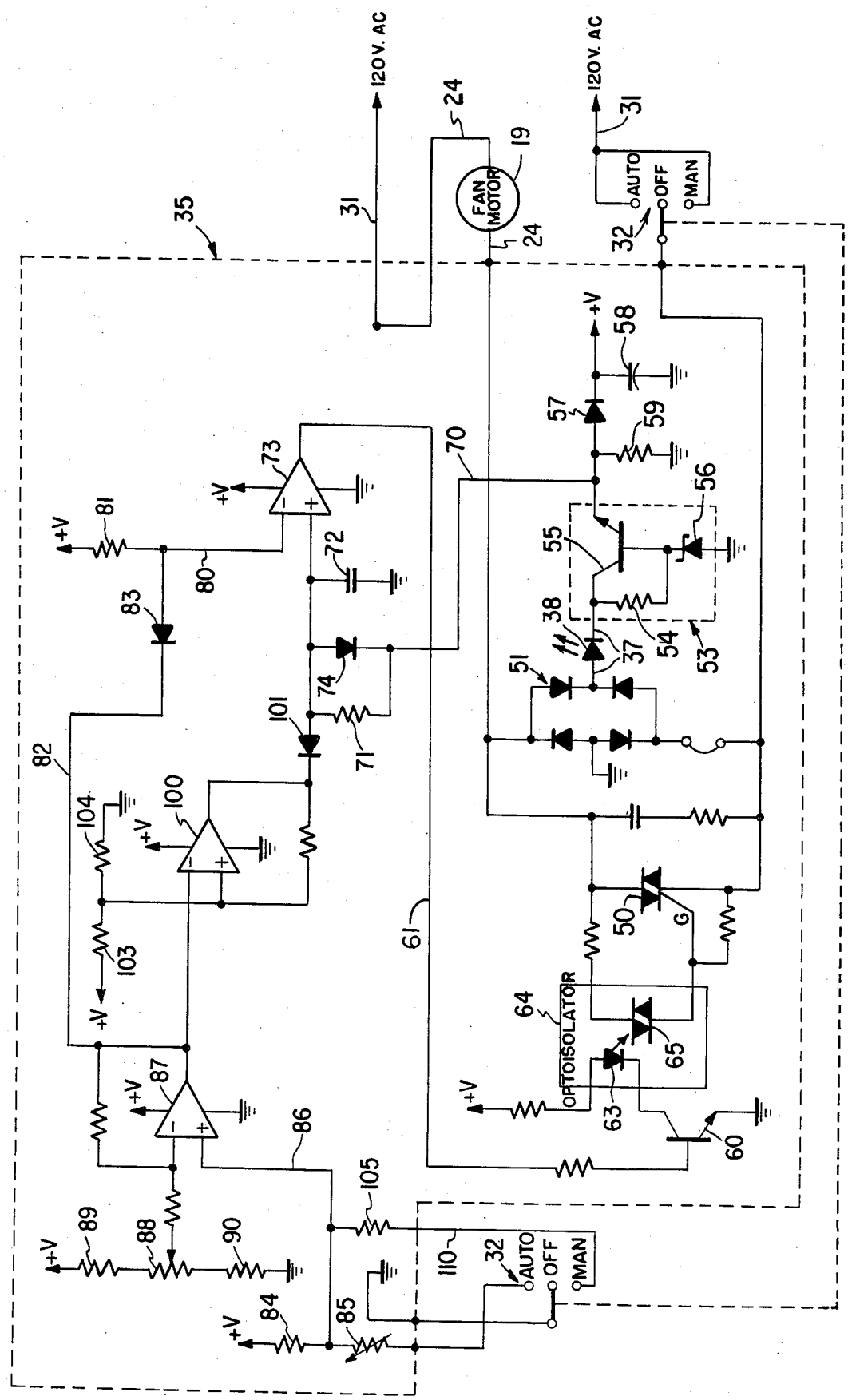
FIG. 3 is a schematic illustration of the control circuit supplying power to the drive motor of the table fans.

As illustrated in the circuit diagram of FIG. 3, the fan motor 19 and the rocker switch 32 are connected one in each of the lines of the power cord 31 so that in the central or off position of the switch 32 the fan motor will be disconnected completely from the source of electrical power.

The circuit will now be described with reference to the condition in which the rocker switch 32 is shifted to the auto position shown in FIG. 3. In this auto condition of switch 32 it is a triac 50 which is connected between the lines 24 to the motor and the power line 31 which determines operation of the fan motor; i.e. during intervals when the triac 50 is on it will connect the lines 24 and 31 and complete an operating circuit for the motor 19 and during those intervals when the triac is off power to the motor will be interrupted.

Also arranged between the lines 24 and 31 is a bridge rectifier 51, providing a full wave DC power supply which is synchronized to the power supply and provides referenced timing or phase relation to the control of the triac 50 as will be explained hereinbelow.

An LED in the line 37 from the bridge rectifier 51 serves as the signal lamp 38 and a voltage regulator indicated generally at 53 may include a resistor 54, a transistor 55 and a Zener diode 56 providing a desired voltage level at approximately 14 volts, while a diode 57 isolates the DC voltage supply a capacitor 58 provides for voltage maintenance, and a resistor 59 unloads the circuit between AC cycles.

The amount of current passed by the DC power supply is so small as to have no perceptable influence in operation of the motor 19.

For influencing the triac 50 which controls the operation (speed) of the fan motor 19, a transistor 60 is provided which is turned on when the output in line 61 leading to the transistor 60 is high. When transistor 60 is on, current flows through resistor 62 and through an LED 63 in optoisolator 64. The LED is optically coupled to a bilateral switch 65 and causes the bilateral switch to conduct supplying current to the gate of the triac 50 turning the triac 50 on thus conducting current through lines 24 and 31 to operate the fan motor.

Figure 4A:
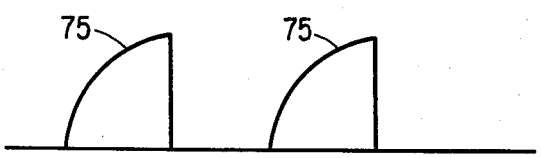
FIG. 4A depicts the wave form shape of one input voltage applied to the fan motor controlling comparator.

Whenever the triac 50 is turned on, a short circuit occurs across the bridge rectifier 51 at which point the generated DC voltage drips to zero up to the isolating diode 57 and capacitor 58 which maintain the generated DC voltage beyond the diode 57. In advance of the diode 57 a line 70 directs the pulsating DC voltage through a resistor 71 to a capacitor 72 and to the positive input of a comparator 73. When voltage in line 70 drops toward zero the capacitor 72 will be discharged through a diode 74 thus generating a wave form 75 of sawtooth configuration applied to the positive input of the comparator 73. This sawtooth shaped wave form is indicated at 75 in FIG. 4A.

The negative input of the comparator 73 via a line 80 is supplied from the generated DC voltage through a resistor 81, the voltage level of which is varied by a line 82 including a diode 83 which influences the amount of voltage bled from line 80.

Figure 4B:
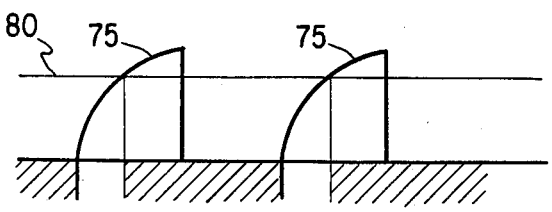
FIG. 4B depicts the interrelation of both inputs of the fan motor controlling comparator in response to decreased temperature.
Figure 4C:
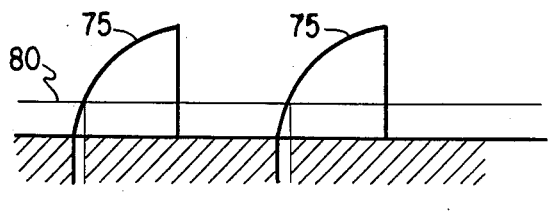
FIG. 4C depicts the interrelation of both inputs of the fan motor controlling comparator in response to increased temperature.

The output of the comparator 73 on line 61 leading to the transistor 60 during each cycle of the alternating current applied to the fan depends upon the relationship between the voltages applied to the positive and negative inputs of the comparator 73. When the voltage level at the negative input exceeds that at the positive input the output on line 61 will be low and as the voltage at the positive input exceeds that on the negative input the output turns high. The transistor 60 is on when the output on line 61 is high and off when the output goes low. FIGS. 4B and 4C illustrate the influence of variation in the voltage level applied to the negative input of the comparator 73. When the voltage level on the negative input is high, as shown in FIG. 4B, the period during each cycle that the output on line 61 to the transistor 60 is high will be relatively short as indicated by the shaded area in the figure. Conversely the lowering of voltage on the negative input to comparator 73 lengthens the time during each cycle that the line 61 will be high. By way of triac 50 this variation in time of power application to the fan motor during each cycle of alteration of the power supply directly influences the speed of operation of the fan motor 19.

Referring to the rocker switch 32, it will be noted that in the auto position of the switch the generated DC voltage will be directed through a temperature responsive element 85 which may preferably be a thermistor having a negative temperature coefficient which lowers the voltage directed in line 86 to the positive input of a closed loop amplifier 87 when the sensed temperature rises and vice versa. The voltage on the negative input of the amplifier 87 is influenced by a variable resistor 88 in a DC circuit between resistors 89 and 90 which variable resistor 88 is influenced by the operator influenced knob 36 to set the desired fan speed manually.

The amplifier 87 is a closed loop amplifier with limited gain and the output not only influences how much voltage is bled from the negative input of comparator 73 on line 80 but also provides the negative input to an operational amplifier 100 arranged as a comparator where it is compared with the voltage on the positive input of 100 and serves, as will now be described, to interrupt fan motor operation completely whenever a predetermined low speed is reached.

The voltage applied at the positive input of the comparator 100 is preset by selection of the values of resistors 103 and 104. When the voltage applied at the negative input to comparator 100 equals or exceeds that applied at the positive input the output of the comparator 100 goes low discharging capacitor 72 through diode 101 which dissipates the sawtooth ramp voltage from the positive input of the comparator 73 thus terminating further supply of any power to the fan motor 19, or preventing any attempt to start the motor under conditions which would otherwise dictate a starting motor speed below a predetermined minimum.

As shown in FIG. 2, the temperature responsive element 85 is preferably arranged on the circuit board 35 remote from the signal light 38 or the fan motor, and thus is spaced from any appreciable source of heat. The element 85 is, however, in the path of ambient air flow from the vent holes 22 in the bottom panel through the hollow base and standard to the clearance 23. Air flow is induced through the hollow base and standard by negative pressure rearwardly of the fan blades 18 during fan motor operation. Additionally, vent holes 28 may be formed in the fan base immediately over the temperature responsive element to enhance the influence of ambient air temperature on the element 85.

When the rocker switch 32 is shifted to the manual position, a resistor 105 of fixed value is connected to ground from the line 86 rather than the temperature responsive element 85, so that whatever speed the fan motor is set for by adjustment of resistor 88 by way of the knob 36, will remain substantially constant regardless of changes in temperature of the environment.

In the manual mode as influenced by shifting the switch 32 into the manual position all of the other elements of the control circuit are utilized and function as when in the automatic mode; the only difference being that the temperature responsive element is effectively disconnected from the circuit and replaced by a resistance 105 of fixed value.

This invention thus provides for either a fixed fan speed at an operator selected rate, or for automatic variation of fan speed from an operator selected rate in proportion to sensed variation in temperature of the air being moved by the fan. With this arrangement the perceived cooling effect of a table fan can remain uniform despite temperature variations of the ambient air; as the air becomes cooler, the fan speed decreases and vice versa.

The simplicity and cost effectiveness of the control arrangement of this invention make it practical for use in inexpensive table fans and the like devices.

Having set forth the nature of this invention, what is claimed herein is:

1. A control circuit adapted to be coupled with an alternating current power source for varying the speed of operation of a blower drive motor in predetermined proportion to changes in temperature of a medium being impelled by said blower, said control circuit including:

a triac arranged in series with the blower drive motor for regulating the time during each cycle of said alternating current power source that current is supplied to said blower motor, a voltage comparator having an output applied as a signal influencing firing of said triac, means generated by current alternation of said power source for applying voltage in a sawtooth shaped wave form to one input of said voltage comparator, means including a temperature responsive element arranged in a path of said medium being impelled by said blower for applying a voltage level proportional to the temperature of said medium to the other input of said voltage comparator, said voltage comparator serving to generate said signal on said output upon each instance of said sawtooth shape wave form voltage exceeding said voltage influenced by said temperature responsive element.

2. A control circuit as set forth in claim 1 in which said temperature responsive element has a negative temperature coefficient and is arranged to influence variation of said voltage level inversely with temperature, whereby as said temperature rises said voltage level will decrease and said triac will be signaled to supply current to said blower drive motor for an increased time during each cycle of said alternating power source to increase said blower drive motor speed.

3. A control circuit as set forth in claim 2 including means for interrupting current supplied to said blower drive motor when the time during each cycle of said alternating current power source that current is supplied to said blower drive motor is reduced below that sufficient to maintain a predetermined minimum blower motor speed, said interrupting means comprising a second voltage comparator having an output connected by way of a diode to that input of the voltage comparator to which said sawtooth shaped wave form is applied, means influenced by said temperature responsive element for supplying voltage inversely proportional to temperature to one input of said second voltage comparator, means for supplying a predetermined reference voltage to the other input of said second voltage comparator, said second voltage comparator delivering a low voltage output whenever the input voltage inversely proportional to temperature exceeds said predetermined reference voltage input to dissipate said sawtooth shaped wave form input to said triac controlling voltage comparator thereby terminating any further supply of power to the blower drive motor.

4. A control circuit as set forth in claim 1 in which said blower includes a hollow support including a base and a standard rising from said base, means adjustably supporting said drive motor and said blower on said standard with clearance therebetween to accommodate a blower induced stream of ambient air through said hollow support; and in which said means including said temperature responsive element is arranged in a path of said medium being impelled by said blower by being arranged within said hollow support in said stream of blower induced ambient air.

5. A control circuit as set forth in claim 4 in which an exposed surface on said hollow base remote from said drive motor and blower supporting means is formed with an air vent opening, and in which said temperature responsive element is arranged within said hollow base immediately beneath said air vent opening.

* * * * *